UNITED STATES PATENT OFFICE.

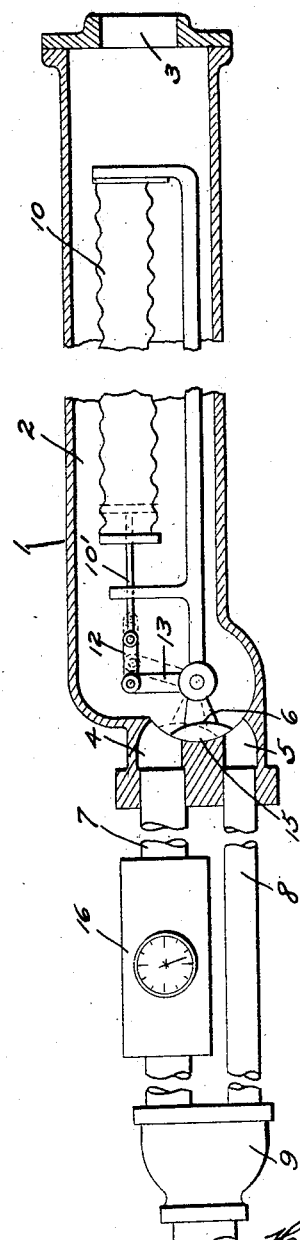

HOMER LEE COVERT, OF LOUISVILLE, KENTUCKY, ASSIGNOR TO DOW WIRE & IRON WORKS, OF LOUISVILLE, KENTUCKY, A CORPORATION OF KENTUCKY.

METER FOR MEASURING THE HEAT FLOW THROUGH PIPES.

1,411,165.  Specification of Letters Patent.  Patented Mar. 28, 1922.

Application filed April 20, 1920. Serial No. 375,238.

*To all whom it may concern:*

Be it known that I, HOMER LEE COVERT, a citizen of the United States, residing at Louisville, in the county of Jefferson and State of Kentucky, have invented certain new and useful Improvements in Meters for Measuring the Heat Flow Through Pipes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to meters for measuring the heat flow through a pipe, and has for its object to record the total heat units which have passed through a main pipe line.

The invention consists of the arrangement of a thermostat or temperature responsive device, and a valve so disposed in relation to a suitable meter as to regulate and control the quantity of heat units passing through the meter proportionately to the temperature of the fluid in the main line, as will hereinafter be more fully described.

Referring to the accompanying drawing:

The figure is a diagrammatic view partly in section illustrating the parts and the relative arrangement thereof.

In the drawing, 1 indicates the device which includes the chamber 2 fitted at 3 for connection to a main pipe line through which the fluid flows, the other end of said chamber having two openings 4 and 5 controlled by a valve 6 and receiving the two pipe lines 7 and 8; said pipe lines 7 and 8 being again united by the fitting 9 in the manner as shown in the drawing.

Disposed in the chamber 2 in any convenient manner is a thermostat 10, having a rod 10' connected by a link 12 to a bell crank 13 of an oscillatory valve 6, the effective surface 15 of which may oscillate to close either one of the openings 4 and 5, or to partially close both openings to restrict the passage of fluid from the chamber 2 through the meter or through the line or by-pass 8 under the influence of the thermostat 10.

Having thus described the several parts of the invention, its operation is as follows:

The thermostat expands upon increase of temperature in the chamber 2, which expansion moves the valve 6 to uncover the opening 4 to the meter and restrict the passage to the by-pass 8; while upon contraction of the thermostat this valve movement is reversed. Therefore as the temperature increases, a greater per cent of the fluid passing through the chamber 2 is directed through the meter, while a drop in temperature causes an increased flow through the by-pass 8.

With the proper openings to keep the correct per cent of area at 4 open to the meter for any temperature, there will be a constant factor which when multiplied by the discharge through the meter will give the total heat units which have travelled through the main line, which factor will remain the same for any flow or temperature.

The meter 16 should preferably be a fluid meter fitted with a dial to read in heat units instead of fluid flow, however a fluid meter with ordinary dial may be used, in which case the factor must be applied to the meter reading in order to arrive at the heat flow.

To calibrate the instrument, or to determine the factor, a thermometer and meter are inserted in the main line, and readings of these instruments are taken concurrently with readings of the meter 16.

The B. T. U. flow is computed from the temperature and total flow, which figure should check with the reading of the meter 16. Should the meter 16 be not calibrated to read in B. T. U.'s, said figure divided by the reading of the meter 16 will determine the factor.

Having thus fully described the invention, what I claim as new and desire to secure by Letters Patent of the United States, is:

A device of the character described, including a thermostat and means for receiving fluid from a main pipe line, said means having two outlets and containing said thermostat, a meter connected to one outlet, a by-pass around the meter and connected to the other outlet, and a valve actuated by the thermostat for controlling the division of fluid flow through said meter and through said by-pass, so that the percentage of flow through the meter will vary directly as the temperature varies.

In testimony whereof, I affix my signature, in presence of two witnesses.

HOMER LEE COVERT.

Witnesses:
RAY G. RATTERMAN,
ROBERT B. LOGAN.